Patented June 1, 1954

2,680,074

UNITED STATES PATENT OFFICE 2,680,074

LIGHT-SENSITIVE DIAZOTYPE MATERIAL

Oskar Süs, Wiesbaden-Biebrich, Germany, assignor, by mesne assignments, to Keuffel & Esser Co., Hoboken, N. J., a corporation of New Jersey No Drawing. Application February 7, 1951, Serial No. 209,907

Claims priority, application Germany February 13, 1950

7 Claims. (Cl. 95—6)

This invention relates to light-sensitive diazotype materials. In particular, it relates to light-sensitive diazotype materials which yield prints having desirable dark blue and black images and which do not fade after storage.

Mono diazo compounds of p-diamino benzenes containing a secondary or tertiary nitrogen atom have been used as light-sensitive diazo compounds in combination with 2,3-dihydroxy-naphthalene and its derivatives as azo coupling components. Light-sensitive materials for the dry development of black-line images are prepared almost exclusively on this basis.

The quality of these light-sensitive materials depends on the shelf-life in the unexposed state, the light fastness of the print and the stability of the background and the dyestuff image after exposure and development (preservation of contrast). Several derivatives of 2,3-dihydroxynaphthalene particularly the otherwise extremely suitable 2,3-dihydroxy - naphthalene-6-sulfonic acid when used in combination with the very frequently used 1-diethylamino-4-diazo benzene yield dark blue images the contrast of which lowers during storage under normal conditions.

Now, it has been found that light-sensitive diazotype material can be prepared which yields prints of greatly improved storage stability by using 2,3-dihydroxy - naphthalene - 6 - sulfonic acid or its salts in combination with a light-sensitive diazo compound of a p-diamino benzene of the general formula

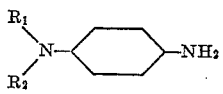

wherein $R_1$ represents hydrogen, alkyl, aralkyl, aryl,

—$CH_2.CH_2NH$—alkyl or

—$CH_2.CH_2.N(C_2H_5)_2$ and $R_2$ represents the radical

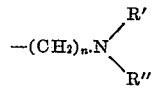

in which

R' stands for hydrogen or alkyl,

R'' stands for alkyl—, aralkyl—, or aryl and $n$ stands for 1, 2 or 3.

The benzene nucleus may carry other suitable substituents such as alkyl radicals or alkoxy groups or both.

The basicity of the secondary or tertiary nitrogen atom linked to the benzene nucleus in the diazo compounds used according to this invention is very weak. The azo dyestuffs which result from the coupling of said diazo compounds with an azo component are consequently unable to form salts—salt formation of the basic azo dye would lead to a change of color—under the pH conditions normally prevailing in the surface layers of diazotype prints.

Because of their good solubility, diazo compounds in which $R_1$, R' and R'' represent alkyl groups of less than 4 carbon atoms have been found to be particularly suitable. Diazo compounds with aromatic radicals attached to the external nitrogen atom are of a particularly good solubility if the aromatic radical contains substituent groups which tend to increase solubility in water. Such groups are preferably basic groups capable of salt formation. A diazonium group can function as a basic group for this purpose. In this case, symmetrically built tetrazo compounds can be used.

These diazo and tetrazo compounds can be prepared by reacting 2 molecules of aniline or its alkyl- or aralkyl-substituted derivatives and their substitution products with an equimolecular quantity of an alkylaminohalogen alkane or with one mole of an alkyl-di-halide. An amino group is introduced into the para-position of the secondary or tertiary bases resulting from this reaction in the usual manner by way of nitrosation or coupling with diazotized aromatic bases, for example sulfanilic acid or aniline, and subsequently reducing the nitroso compounds and azo dyes respectively.

Subsequent to the diazotization of the obtained bases, the diazo compounds are separated in the usual manner as double metal salt complexes which are used for the production of the light-sensitive layers.

In order to illustrate the above described invention the following examples are inserted.

(1) 2,5 g. of the zinc chloride double salt of the diazo compound derived from 1-[N-ethyl-N-(β-diethylaminoethyl)]-amino-4-amino benzene are added to a solution consisting of 3,5 g. of citric acid, 4,0 g. of thiourea, 1,8 g. of 2,3-dihydroxy-naphthalene-6-sulfonic acid sodium salt, and 3,0 g. of 1,3,6-naphthalene-trisulfonic acid sodium salt in 100 cc. of distilled water and paper is coated on one side with this solution.

Using paper prepared in this manner, copies can be made in a conventional diazo machine. Prints made of line-drawings and developed with ammonia gas show deep blue lines on a white background which are formed by color stable dyestuffs.

The greater stability of the dyestuff in prints obtained according to Example 1 compared with the dyestuff in prints obtained with paper coated with p-diazo-diethylaniline can be demonstrated by subjecting the dyestuffs to a spot analysis using a 10% acetic acid as reagent. In the first case no color change takes place, whereas in the latter instance the color shade changes from blue to yellow-brown.

(2) As in Example 1, 2,7 g. of the zinc chloride double salt of the diazo compound derived from 1-[N-di-(β-diethylaminoethyl)]-amino-4-amino benzene are added to 100 cc. of the solution mentioned in Example 1, and this solution is used to prepare light-sensitive paper. Prints made from this light-sensitive material have images of stable dyestuffs.

(3) 3 g. of the zinc chloride double salt of the diazo compound derived from 1-[N-benzyl-N-(β-diethylaminoethyl)]-amino-4-amino benzene are dissolved in 50 cc. of water by slightly raising the temperature and this solution is added to a solution obtained by dissolving 4,0 g. of citric acid, 4,0 g. of thiourea, and 1,8 g. of 2,3-dihydroxy-naphthalene-6-sulfonic acid sodium salt in 50 cc. of water.

Paper sensitized with this solution yields prints having deep blue lines and good fastness properties. Instead of the above mentioned diazo compound, the zinc chloride double salt of the diazo compound derived from 1-[N-benzyl-N-(β-diethylaminoethyl)]-amino-3-methoxy-4-amino benzene may be used.

(4) 1,6 g. of the tin tetrachloride double salt of the diazo compound of 1-[N-benzyl-N-(β-ethyl-β-p-methylphenylaminoethyl)-amino-4-amino benzene are dissolved in 25 cc. of water by slightly raising the temperature and this solution is added to a solution obtained by dissolving 1,0 g. of citric acid, 1,0 g. of 1,3,6-naphthalene-trisulfonic acid sodium salt, and 1,4 g. of 2,3-dihydroxy-naphthalene-6-sulfonic acid sodium salt in 25 cc. of water.

This solution is coated on a paper base and the thus obtained light-sensitive paper can be used for the production of prints as described in Example 3.

Having thus described the invention, what I claim is:

1. A diazotype photosensitive material comprising a base and a light-sensitive layer coated on said base containing an azo coupling component selected from the group consisting of 2,3-dihydroxy-naphthalene-6-sulfonic acid and its salts and a light-sensitive diazo compound of a compound selected from the group of p-diamino benzenes of the general formula

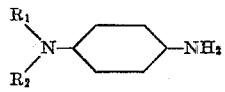

wherein $R_1$ represents alkyl, aralkyl,

—CH$_2$.CH$_2$NH—alkyl or

—CH$_2$.CH$_2$.N(C$_2$H$_5$)$_2$ and $R_2$ represents the radical

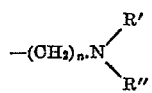

in which

R′ stands for hydrogen or alkyl,

R″ stands for alkyl-, aralkyl-, or aryl and $n$ stands for 1, 2 or 3 and such p-diamino benzenes in which the benzene nucleus carries at least one other substituent selected from the group consisting of alkyl radicals and alkoxy groups.

2. A diazotype photosensitive material comprising a base and a light-sensitive layer coated on said base containing an azo coupling component selected from the group consisting of 2,3-dihydroxy-naphthalene-6-sulfonic acid and its salts and a light-sensitive diazo compound of a compound selected from the group of p-diamino benzenes of the general formula

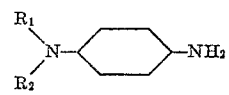

wherein $R_1$ represents alkyl, aralkyl,

—CH$_2$.CH$_2$NH—alkyl or

—CH$_2$.CH$_2$.N(C$_2$H$_5$)$_2$ and $R_2$ represents the radical

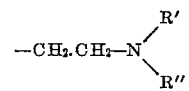

in which

R′ and R″ stand for alkyl containing 1 to 3 carbon atoms and such p-diamino benzenes in which the benzene nucleus carries at least one other substituent selected from the group consisting of alkyl radicals and alkoxy groups.

3. A diazotype photosensitive material comprising a base and a light-sensitive layer coated on said base containing an azo coupling component selected from the group consisting of 2,3-dihydroxy-naphthalene-6-sulfonic acid and its salts and the diazo compound derived from 1-[N-ethyl-N-(β-diethylaminoethyl)]-amino-4-amino benzene.

4. A diazotype photosensitive material comprising a base and a light-sensitive layer coated on said base containing an azo coupling component selected from the group consisting of 2,3-dihydroxy-naphthalene-6-sulfonic acid and its salts and the diazo compound derived from 1-[N-di-(β-diethylaminoethyl)]-amino-4-amino benzene.

5. A diazotype photosensitive material comprising a base and a light-sensitive layer coated on said base containing an azo coupling component selected from the group consisting of 2,3-dihydroxy-naphthalene-6-sulfonic acid and its salts and the diazo compound derived from 1-[N-benzyl-N-(β-diethylaminoethyl)]amino-4-amino benzene.

6. A diazotype photosensitive material comprising a base and a light-sensitive layer coated on said base containing an azo coupling component selected from the group consisting of 2,3-dihydroxy-naphthalene-6-sulfonic acid and its salts and the diazo compound derived from 1-[N-benzyl - N - ($\beta$ - diethylaminoethyl)] - amino-3-methoxy-4-amino benzene.

7. As a new article of manufacture diazotype photosensitive material comprising a base and a light-sensitive layer on said base containing an azo coupling component selected from the group consisting of 2,3-dihydroxy-naphthalene-6-sulfonic acid and its salts and 1-[N-benzyl-N-($\beta$-ethyl - $\beta$ - p - methylphenylaminoethyl)]-amino-4-amino benzene.

References Cited in the file of this patent
UNITED STATES PATENTS

| Number | Name | Date |
| --- | --- | --- |
| 2,442,061 | Slifkin | May 25, 1948 |
| 2,531,485 | Von Glahn et al. | Nov. 28, 1950 |